United States Patent [19]

Clarke

[11] Patent Number: 5,502,636
[45] Date of Patent: Mar. 26, 1996

[54] PERSONALIZED COUPON GENERATING AND PROCESSING SYSTEM

[75] Inventor: F.G.E. Clarke, Essex, Conn.

[73] Assignee: R.R. Donnelley & Sons Company, Chicago, Ill.

[21] Appl. No.: 830,318

[22] Filed: Jan. 31, 1992

[51] Int. Cl.⁶ .................................... G06F 151/00
[52] U.S. Cl. .......................... 364/401; 364/402
[58] Field of Search ...................... 364/401, 402, 364/479, 405, 406; 235/381, 385; 186/52, 55–56

[56] References Cited

U.S. PATENT DOCUMENTS

| | | | |
|---|---|---|---|
| 4,674,041 | 6/1987 | Lemon et al. | 364/401 |
| 4,896,791 | 1/1990 | Smith . | |
| 4,908,761 | 3/1990 | Tai | 364/401 |
| 5,128,752 | 7/1992 | Von Kohorn | 358/84 |

OTHER PUBLICATIONS

Neal, Mollie, "Quaker's direct hit."(Quaker Oats Co's. advertizing subsidiary Quaker Direct), Direct Marketing, V53, N9, p. 52 (3), Jan. 1991.

Primary Examiner—Gail O. Hayes
Assistant Examiner—Frantzy Poinvil
Attorney, Agent, or Firm—Arnold, White & Durkee

[57] ABSTRACT

A personalized coupon generating and processing system includes a coupon dispensing source that communicates with responsive consumers through a communications interface. The availability of preselected coupons is communicated to the consumers by an availability communications means, and consumer responses are communicated to the coupon dispensing source by consumer response means. Consumer requested coupons are personalized and distributed to the responsive consumers. Redemption of the coupons is communicated to the coupon dispensing source by redemption data means.

7 Claims, 1 Drawing Sheet

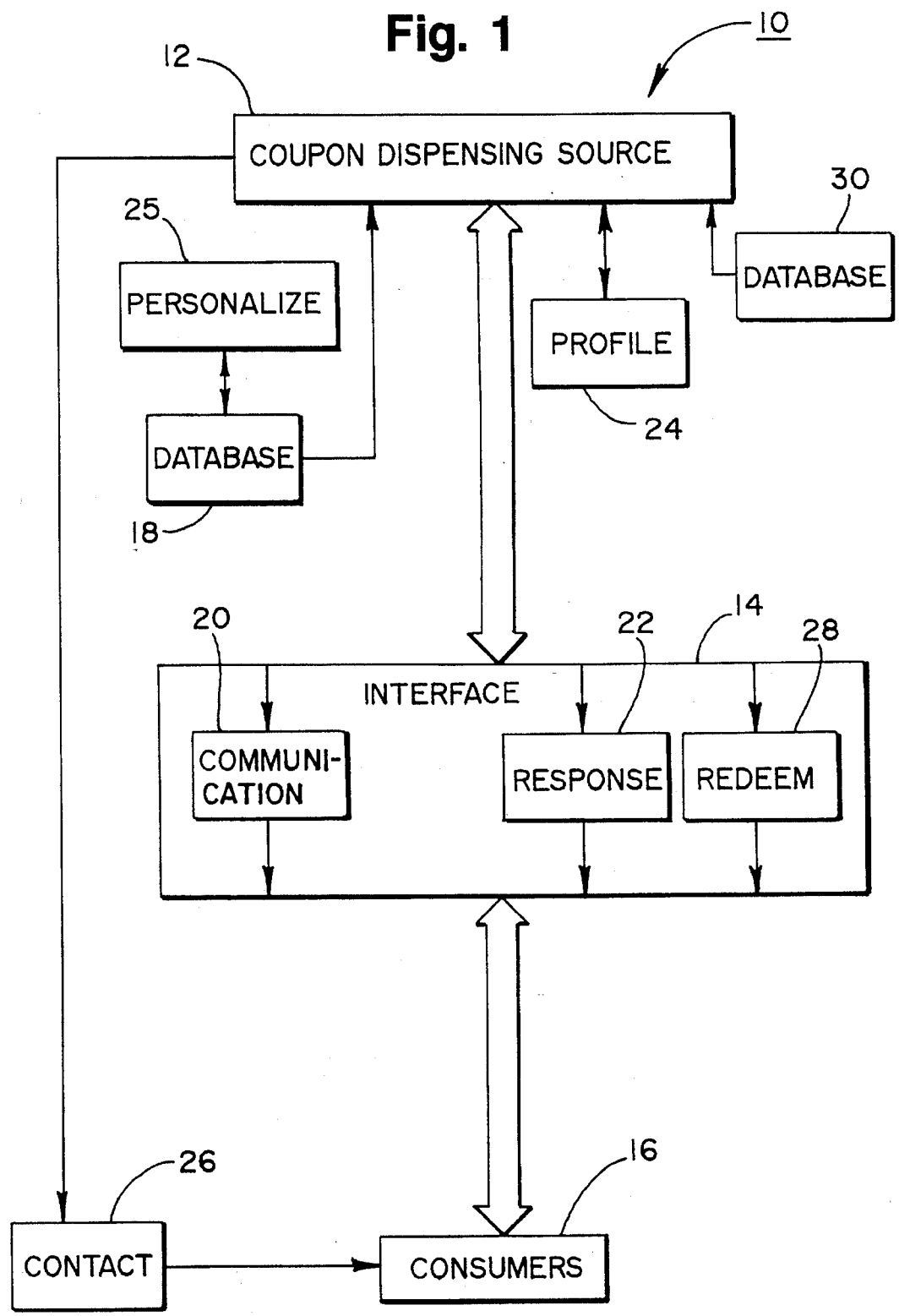

PERSONALIZED COUPON GENERATING AND PROCESSING SYSTEM

BACKGROUND OF THE INVENTION

1. Field of the Invention

The present invention relates to a new and improved system for generating and processing personalized coupons that may be redeemed for specific products.

2. Description of the Background Art

The typical approach currently used to distribute coupons to an audience is through a mass mailing or distribution. The response rate or redemptions of coupons distributed in this manner is very small. Consequently, the effectiveness of these coupon distribution procedures could be greatly improved. These procedures are also subject to fraud since the specific individuals who receive and redeem the coupons are not tracked. Consequently, data about the responsiveness of the specific audience receiving the coupons is sketchy and often cannot be collected.

It would be desirable to be able to target a specific audience for coupons for specific products. Preferably, by distributing coupons to a target audience the distribution would be highly effective and a high level of response or redemption would be experienced. It would also be desirable to be able to track the specific individuals receiving coupons and to gather redemption information regarding those individuals.

SUMMARY OF THE INVENTION

Briefly, the present invention is directed to a new and improved system for generating and processing personalized coupons. This system identifies a group of consumers that are likely to be responsive to coupons for predefined products available from a coupon dispensing source and promotes coupon based transactions from the consumers.

The system includes a communications interface for informing consumers of the availability of coupons for predefined products. Responsive consumers inform the coupon dispensing source of specific requests for certain products through the communications interface. The system also obtains profile information from the responsive consumers. The request data and profile data are used by the system to sort the requested coupons for each responsive consumer and to personalize the requested coupons. The personalized coupons are then distributed to the responsive consumers, and data regarding redemption are gathered by the system and a database is created. The redemption database can be used for additional marketing research.

BRIEF DESCRIPTION OF THE DRAWING

The above and other objects and advantages and novel features of the present invention will become apparent from the following detailed description of a preferred embodiment of the invention illustrated in the accompanying drawing, wherein:

FIG. 1 is a flow chart illustrating the system of the present invention.

While the invention is susceptible to various modifications and alternative forms, a specific embodiment thereof has been shown by way of example in the drawing and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to FIG. 1, there is illustrated a personalized coupon generating and processing system generally designated by the reference number 10. The personalized coupon generating and processing system 10 is presented in a flow-chart format in FIG. 1 to illustrate the operation of the system 10.

The personalized coupon generating and processing system 10 includes three principal components; a coupon dispensing source 12, a communications interface 14 and an audience of responsive consumers 16. In operation, the personalized coupon generating and processing system 10 dispenses coupons to responsive consumers 16 by way of communicating the availability of the coupons through the communications interface 14. The responsive consumers 16 communicate back to the coupon dispensing source 12 through the communications interface indicating a preference for selected coupons. The selected coupons are then personalized and distributed to the responsive consumers 16. More specifically, the personalized product promotion coupon generating and processing system 10 identifies a group of consumers 16 responsive to coupons for predefined products available from a coupon dispensing source 12 and promotes coupon-based transactions from the consumers 16.

To perform the operation as described, the coupon dispensing source 12 includes a coupon database 18 in which preselected coupons are sorted relative to preselected products. The coupon dispensing source 12 communicates with the responsive consumers 16 through the communications interface 14 and specifically through an availability communication means 20 to inform an audience of consumers of the availability of coupons for preselected products. This availability communication means 20, for example, can be cable and broadcast television advertising offering coupons for specific products. This advertising would be aired to a specific target profile demographic area. A response to the coupon offer is communicated through a consumer response means 22 which can be a 1–800 number through which responsive consumers 16 can place their orders for coupon packets available from the coupon database 18. These responses are communicated by the consumer response means 22 to the coupon dispensing source 12.

In addition to requesting specific coupons, the responsive consumers 16 also provide profile information through the consumer response means 22. This profile information is assembled and stored in a profile database 24. The coupon dispensing source 12 utilizes the profile data from the profile database 24 with the coupon database 18 to personalize the coupons to be sent to individual responsive Consumers 16 by using personalizing means 25. The coupon dispensing source 12 then packages the personalized coupons in packets. The packets are provided to the responsive consumers 16 through a consumer contact 26. For example, the packets can be mailed to the responsive consumers. The packets of personalized coupons include coupons specifically requested by the individual responsive consumers 16, and may also include other in-context offerings for coupons or other offerings or coupons as determined by the coupon dispensing source 12.

As consumers redeem their coupons, redemption information is communicated by a redemption data means 28 in the communications interface 14 to the coupon dispensing source 12. The redemption data are then collated and collected in a redemption database 30. The data in the redemption database 30 may then be compared with the coupon database 18 to determine the redemption rate. Comparison may also be made with the profile database 24 to determine who did not redeem their coupons. This allows additional market research into the reasons for redemption or failure to redeem the personalized coupons. This information has not been available in prior art systems, or if available, it has only been available at a great expense and difficulty.

The use of personalized coupons generated and processed by the system 10 reduces fraudulent redemption that occurs in current coupon offerings. Moreover, the timeliness of the profile data and coupon database allows the market research process to start ninety to one hundred and twenty days sooner than in prior systems. Also, upon redemption of the personalized coupons by the responsive consumers 16, the captured redemption data can be used to validate the original consumer responses and to provide future market research opportunities such as polling responsive consumers 16 and to enhance future specific coupon databases 18. This has not been possible in existing systems because redeemed coupons usually cannot be verified as having been redeemed by the recipient. Moreover, the redemption rate in the personalized coupon generating and processing system 10 will be higher than the three percent redemption rate experienced by existing systems.

What is claimed is:

1. A promotional coupon processing scheme for identifying a group of consumers responsive to certain categories of products and promoting coupon-based transactions from the consumers related at least to those specific products, said scheme comprising the steps of:
    (a) informing consumers of the availability of coupons for predefined products from an identified coupon-dispensing source geographically located remote from the consumers;
    (b) providing a communication medium for said group of consumers responsive to the predefined products to inform said coupon-dispensing source of specific coupon requests corresponding to desired ones of said specific products;
    (c) receiving at said coupon-dispensing source said specific coupon requests along with selected predefined demographic "profile" data from said responsive group of consumers making said coupon requests;
    (d) creating an individualized consumer profile data record in a consumer profile database at said coupon-dispensing source for each consumer in said responsive group of consumers at said coupon-dispensing source from said specific request and profile information received from said responsive group of consumers making said coupon requests;
    (e) in response to receiving said specific coupon requests from said responsive group of consumers and creating said individualized consumer profile data record in said consumer profile database for each consumer in said responsive group of consumers, using said specific request and profile information supplied by said responsive group of consumers and stored in said consumer profile database to prepare personalized promotional coupons at said coupon-dispensing source corresponding only to said respective specific coupon requests of said responsive group of consumers;
    (f) in response to receiving said specific coupon requests from said responsive group of consumers and creating said individualized consumer profile data record in said consumer profile database for each consumer in said responsive group of consumers, forwarding said personalized promotional coupons from said coupon-dispensing source only to corresponding ones of said responsive group of consumers at locations remote from points of purchase;
    (g) providing means for monitoring the subsequent redemption of said personalized coupons; and
    (h) receiving and recording data corresponding to said monitored redemption of personalized coupons at said coupon-dispensing source to create a redemption database therefrom.

2. The promotional coupon processing scheme according to claim 1 wherein additional non-requested promotional coupons are prepared, personalized and forwarded to said requested consumers along with said personalized specific requested coupons.

3. The promotional coupon processing scheme of claim 1 wherein coupons corresponding to said predefined products are made prior to being forwarded to said requesting consumers and specific coupons therefrom are sorted responsive to said received specific coupon requests and correspondingly personalized prior to being forwarded to said requesting consumers.

4. The promotional coupon processing scheme of claim 1 further including the step of comparing data corresponding to said monitored redemption of personalized coupons to data corresponding to said consumer profile database to identify responsive consumers who have requested specific coupons but have not redeemed corresponding forwarded personalized coupons.

5. The promotional coupon processing scheme of claim 4 further including the step of contacting said identified consumers requesting but not redeeming specific product coupons in order to remind said consumers of the non-redeemed coupons and inquire regarding the reasons for non-redemption thereof.

6. A personalized product promotion coupon generating and processing system for identifying a group of consumers responsive to coupons for predefined products available from a coupon-dispensing source geographically located remote from the consumers and for promoting coupon-based transactions from the consumers related to the predefined products, said system comprising:
    (a) first communication means for informing consumers of the availability of coupons for said predefined products from said coupon-dispensing source;
    (b) second communication means for said responsive consumers to inform said coupon-dispensing source of (i) specific coupon requests corresponding to desired ones of said specific products, and (ii) selected demographic profile information for said consumers;
    (c) means for receiving at said coupon-dispensing source said specific coupon requests and said profile information from said responsive group of consumers and creating an individualized consumer profile data record in a consumer profile database at said coupon-dispensing source for each consumer in said responsive group of consumers at said coupon-dispensing source from said specific request and profile information;
    (d) means, responsive to receiving said specific coupon requests from said responsive group of consumers and creating said individualized consumer profile data record in said consumer profile database for each consumer in said responsive group of consumers, for using the specific request and profile information supplied by said responsive group of consumers and stored in said consumer profile database to prepare personalized promotion coupons at said coupon-dispensing source corresponding only to said respective specific coupon requests of said responsive group of consumers;

(e) means, responsive to receiving said specific coupon requests from said responsive group of consumers and storing said specific request and profile information in said consumer profile database at said coupon-dispensing source, for forwarding said personalized coupons from said coupon-dispensing source only to corresponding ones of said responsive group of consumers at locations remote from points of purchase;

(f) monitoring means for monitoring and recording the redemption of said forwarded personalized coupons;

(g) third communication means for forwarding said recorded redemption data to said coupon dispensing source; and (h) means for receiving said recorded redemption data at said coupon dispensing source and creating a redemption database therefrom.

7. The personalized product promotional coupon generating and processing system according to claim 6 further including means for comparing said recorded redemption data to corresponding consumer profile data in order to identify responsive consumers who have requested specific coupons but have not redeemed corresponding personalized coupons.

\* \* \* \* \*